United States Patent [19]

Heinzelmann et al.

[11] Patent Number: 4,618,481
[45] Date of Patent: Oct. 21, 1986

[54] ABSORBENT COMPOSITION CONTAINING A SEVERELY HINDERED AMINO COMPOUND AND AN AMINE SALT AND PROCESS FOR THE ABSORPTION OF $H_2S$ USING THE SAME

[75] Inventors: Fred J. Heinzelmann, Fanwood, N.J.; Noah S. Rothblatt, New York, N.Y.; James P. Glass, Jr.; Geoffrey R. Say, both of Baton Rouge, La.; George R. Chludzinski, South Orange, N.J.; Guido Sartori; W. S. Winston Ho, both of Annandale, N.J.

[73] Assignee: Exxon Research and Engineering Co., Florham Park, N.J.

[21] Appl. No.: 771,515

[22] Filed: Aug. 30, 1985

[51] Int. Cl.⁴ .................. C01B 17/16; C01B 31/20; C09K 3/00
[52] U.S. Cl. .................. 423/228; 423/226; 423/229; 423/220; 252/189; 252/190; 252/188.28; 564/503; 564/505; 564/508; 55/68
[58] Field of Search .......... 423/226, 228, 220, 229, 423/223; 55/73, 68; 252/189, 190, 188.28; 564/508, 505, 503

[56] References Cited

U.S. PATENT DOCUMENTS

| | | | |
|---|---|---|---|
| 2,722,500 | 11/1955 | Rippie et al. | 196/23 |
| 3,139,324 | 6/1964 | Housset | 23/2 |
| 3,848,057 | 11/1974 | Leder et al. | 423/223 |
| 4,080,423 | 3/1978 | Smith et al. | 423/210 |
| 4,153,674 | 5/1979 | Verloop et al. | 423/573 R |
| 4,405,583 | 9/1983 | Stogryn et al. | 423/228 |
| 4,405,585 | 9/1983 | Sartori et al. | 423/228 |
| 4,471,138 | 9/1984 | Stogryn | 564/508 |
| 4,525,294 | 5/1985 | Sartori et al. | 423/226 |
| 4,556,546 | 12/1985 | Burgoyne, Jr. et al. | 423/228 |

FOREIGN PATENT DOCUMENTS 0134948  6/1984  United Kingdom .

Primary Examiner—John Doll
Assistant Examiner—Robert L. Stoll
Attorney, Agent, or Firm—Marthe L. Gibbons

[57] ABSTRACT

An alkaline absorbent composition comprising a severely hindered amino compound and an amine salt is provided. A process for the removal of $H_2S$ from fluid mixtures using this absorbent composition to produce a very low level of $H_2S$ in the treated fluid is also provided. The process is also suited for the selective removal of $H_2S$ from fluid mixtures comprising $H_2S$ and $CO_2$.

28 Claims, 4 Drawing Figures

ABSORPTION-REGENERATION UNIT FOR SELECTIVE $H_2S$ REMOVAL

ABSORPTION-REGENERATION UNIT FOR SELECTIVE H₂S REMOVAL

SPARGED ABSORBER UNIT FOR SELECTIVE H₂S REMOVAL

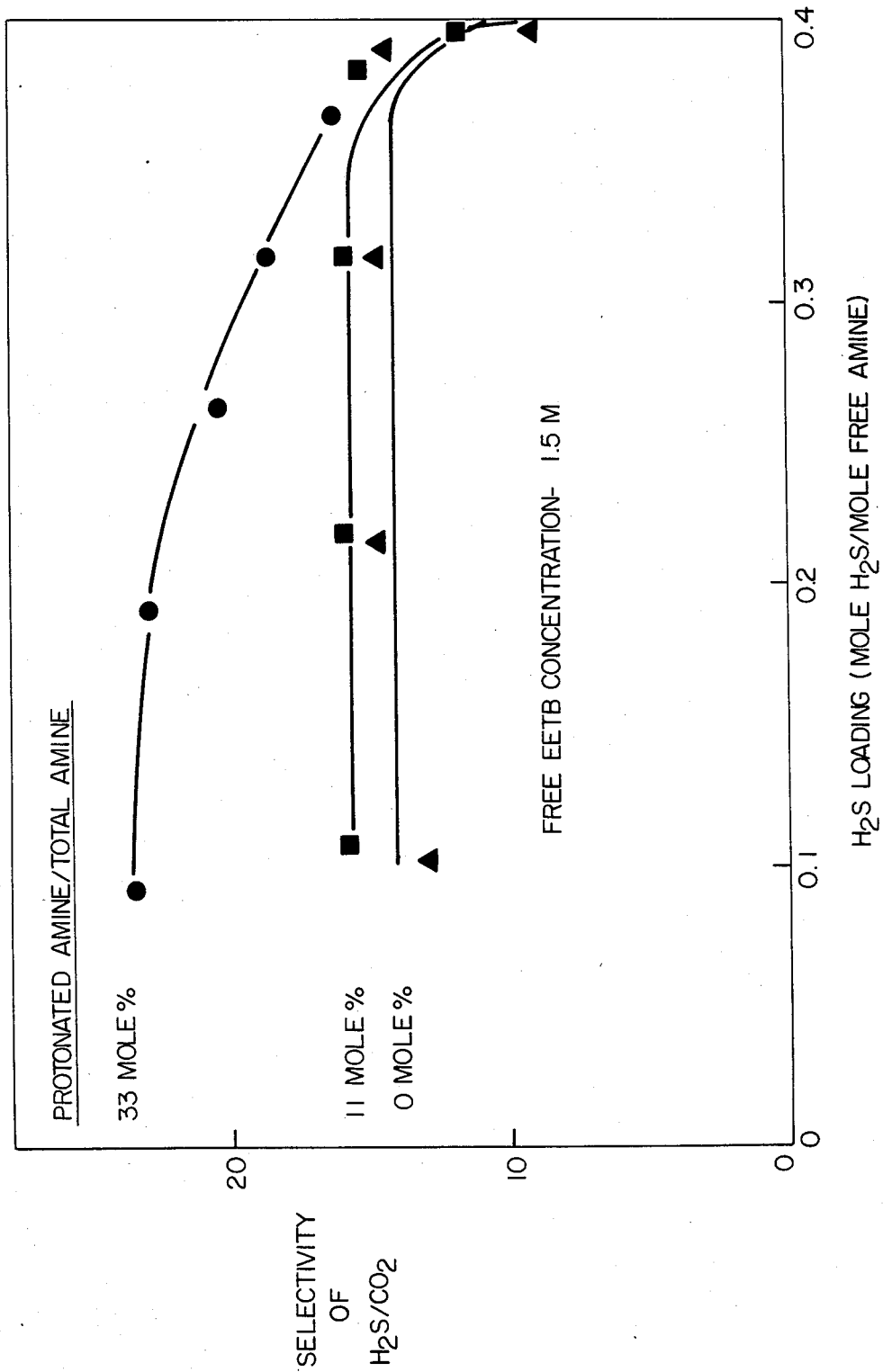

4,618,481

ABSORBENT COMPOSITION CONTAINING A SEVERELY HINDERED AMINO COMPOUND AND AN AMINE SALT AND PROCESS FOR THE ABSORPTION OF H₂S USING THE SAME

BACKGROUND OF THE INVENTION

1. Field of the Invention

This invention relates to an absorbent composition and a process for the selective removal of hydrogen sulfide from a hydrogen sulfide-containing gas using the absorbent composition.

2. Description of Information Disclosures

Processes for the selective absorption of $H_2S$ from gaseous mixture utilizing alkaline liquid absorbents containing amino compounds are known.

It is also known to use a liquid absorbent containing a severely hindered amino compound for the selective removal of hydrogen sulfide from normally gaseous mixtures. See, for example, U.S. Pat. No. 4,405,585 in which the severely hindered amine is a secondary ether alcohol such as the ones claimed in U.S. Pat. No. 4,471,138, and U.S. Pat. No. 4,405,583 in which the severely hindered amino compound is a di-secondary amino ether, the teachings of all of these patents are hereby incorporated by reference.

Although the alkaline absorbents containing the amino compounds are capable of removing acidic gases such as hydrogen sulfide from hydrogen sulfide-containing gaseous mixture, it is progressively more difficult particularly at low pressures to remove hydrogen sulfide at normal operating conditions to a level such that the absorbent-treated gaseous mixture (i.e., exit gas) contains less than about 10 volume parts per million (vppm) hydrogen sulfide. When it is desired to produce a gas having less than 10 vppm hydrogen sulfide, the treated gas, for example, a Claus tail gas, containing more than 10 vppm hydrogen sulfide is typically incinerated to convert the remaining hydrogen sulfide to $SO_2$. Therefore, it would be advantageous to improve the efficiency of the known alkaline amine absorbents to increase the amount of hydrogen sulfide that they are capable of removing at normal operating conditions so as to yield a treated gas having less than about 10 vppm, preferably less than 1 vppm, hydrogen sulfide.

J. H. Dibble's European Patent Application 841075864 (Publication No. 013948) published Mar. 27, 1985 discloses that the absorption of hydrogen sulfide at low pressures by certain alkaline absorbents, which may contain an alkanolamine, is enhanced by using in the absorbent an acid or an acid forming material having a pKa of 6 or less in an amount sufficient to protonate less than 22% of the alkaline material to produce a treated gas having less than 10 vppm hydrogen sulfide.

U.S. Pat. No. 4,153,674 discloses the addition of strong acidic compounds such as acids and ammonium salts thereof to aqueous alkanolamine absorbent solutions, see column 6, lines 33 to 48.

U.S. Pat. No. 2,722,500 discloses removing acid gases from hydrocarbon gases by using an alkanolamine salt of a polybasic acid having a high ionization constant, for example, phosphoric acid, and hydrochloric acid. It discloses that it is convenient to react the acid in advance with the amine.

U.S. Pat. No. 3,139,324 discloses an absorbent solution for $H_2S$ comprising an ethanolamine and a polybasic acid such as phosphoric acid. The ethanolamine is present in an amount between from 0.20 gram mole and 0.02 gram mole per liter.

U.S. Pat. No. 3,848,057 discloses an absorbent solution comprising ethanolamine and a basic salt. The acid gases may contain $H_2S$ and $SO_2$.

U.S. Pat. No. 4,080,423 discloses a process for absorbing acidic gases using a basic component and a weakly dissociated compound such as a weak acid or a salt thereof. Acids and salts listed as suitable include phosphoric acid, and sulfurous acid. As shown in Example 1, the basic component may be ethanolamine and the salt can be sodium phosphate, and the acid gas to be purified may comprise $H_2S$ and $SO_2$.

It has now been found that a treated gas having less than 10 vppm $H_2S$ can be obtained from a low pressure gas with less energy consumption than in known processes and that in treating fluids comprising $H_2S$ as well as $CO_2$, an increased $H_2S$ selectivity can be achieved by utilizing an absorbent composition comprising a specified ratio of an amine salt and an unreacted alkaline severely hindered amino compound.

SUMMARY OF THE INVENTION

In accordance with the invention, there is provided an absorbent composition comprising: (1) at least one severely hindered amino compound having a cumulative $-E_s$ value (Taft's steric hindrance constant) greater than 1.75, and (2) an amine salt, said amine salt being the reaction product of an amine selected from the group consisting of a severely hindered amino compound having a cumulative $-E_s$ value greater than 1.75, a tertiary amine and mixtures thereof and a component selected from the group consisting of an acid having at least one pKa of not more than about 7, a decomposable salt of an acid having at least one pKa of not more than about 7, a compound capable of forming an acid having a pKa of not more than about 7 and mixtures thereof, said amine salt and said severely hindered amino compound being present in said absorbent composition in a mole ratio of said amine salt to said severely hindered amino compound of at least about 0.1:1.

In accordance with the invention there is also provided a process for the selective absorption of hydrogen sulfide using the above-identified absorbent composition.

BRIEF DESCRIPTION OF THE DRAWINGS

FIG. 4 is a graph showing the effect of $H_2SO_4$ addition to tertiary butylaminoethoxyethanol on $H_2S$ selectivity.

DETAILED DESCRIPTION OF THE INVENTION

The Absorbent Composition

Figure 1:
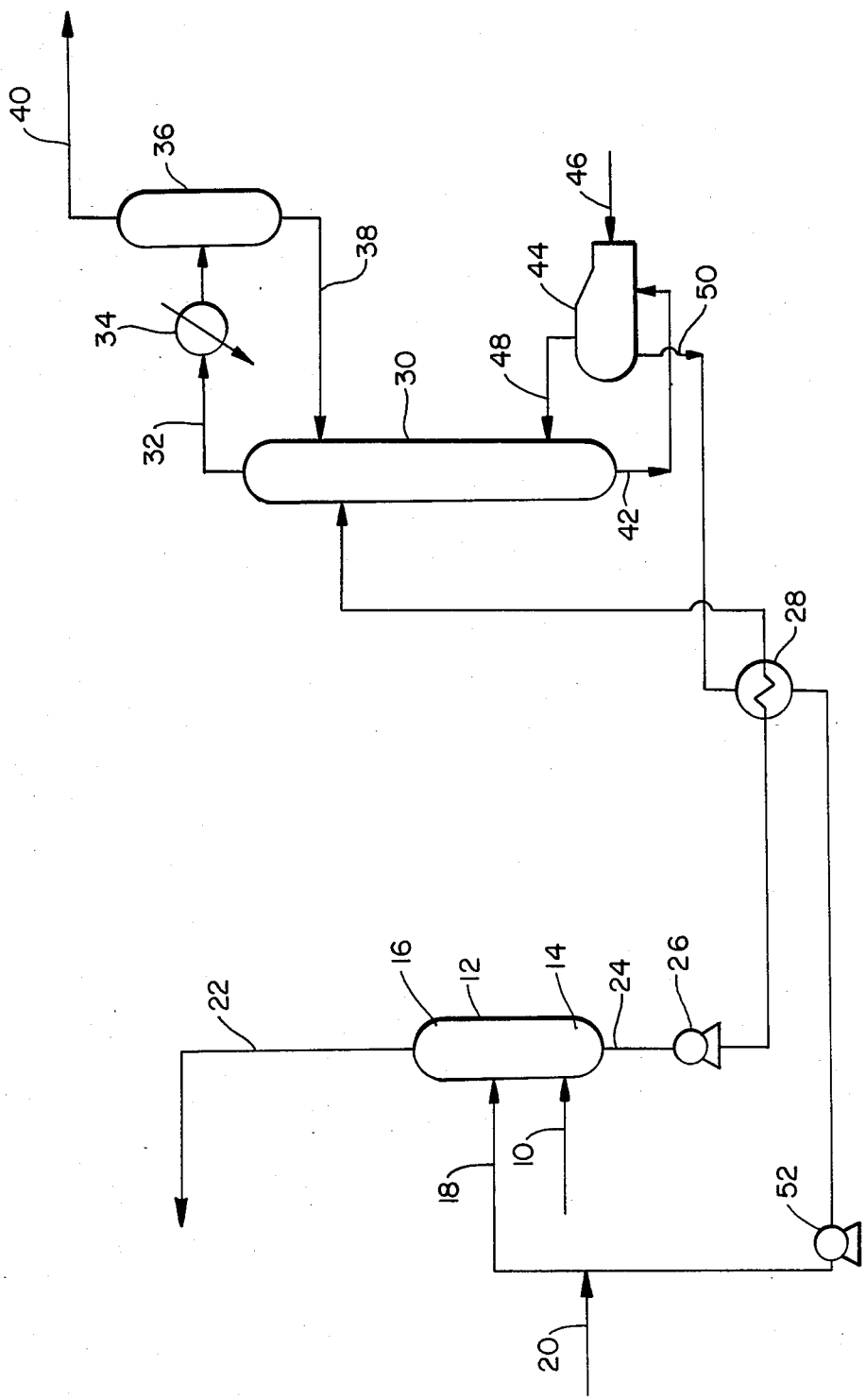
FIG. 1 is a schematic flow plan of one embodiment of the invention.

The absorbent composition of the present invention comprises a severely hindered amino compound (component 1) and an amine salt (component 2). The severely hindered amino compound may be a single type of severely hindered amino compound or a mixture of different types of severely hindered amino compounds.

The amine salt may be a single type of amine salt or a mixture of different types of amine salts.

The severely hindered amino compounds suitable for use as component of the absorbent of the present invention have a degree of steric hindrance such that the cumulative $-E_s$ value (Taft's steric hindrance constant) is greater than about 1.75 as calculated from the values given for primary amines in Table V of D. F. DeTar, *Journal of Organic Chemistry*, 45, 5174 (1980), and are alkaline. The pKa values of these alkaline severely hindered amino compounds at 20° C. are greater than 8.6, preferably greater than 9.5 and more preferably will range from about 9.5 to about 10.6. If the pKa is less than 8.6, the reaction with $H_2S$ is decreased, whereas if the pKa is greater than 10.6, an excessive amount of steam is required to regenerate the solution. The boiling point of the amino compound is typically greater than 180° C., preferably greater than 200° C., more preferably greater than 225° C. to minimize loss of the amino compound by volatilization. Suitable severely hindered amino compounds include secondary amino ether alcohols, such as those disclosed in U.S. Pat. No. 4,471,138, di-secondary amino ethers such as those disclosed in U.S. Pat. No. 4,405,583 and mixtures thereof. Suitable secondary amino ether alcohols disclosed in U.S. Pat. No. 4,471,138 have the general formula:

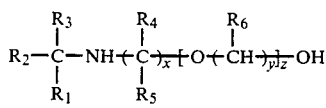

wherein $R_1$ and $R_2$ are each independently selected from the group consisting of alkyl or hydroxyalkyl radicals having 1–4 carbon atoms, $R_3$, $R_4$, $R_5$ and $R_6$ are each independently selected from the group consisting of hydrogen, alkyl of hydroxyalkyl radicals having 1–4 carbon atoms, with the proviso that at least one of $R_4$ or $R_5$ bonded to the carbon atom directly bonded to the nitrogen atom is an alkyl or hydroxyalkyl radical having 1–4 carbon atoms when $R_3$ is hydrogen, x and y are each positive integers ranging from 2–4, and z is a positive integer ranging from 1–4. By way of example, suitable secondary aminoether alcohols include tertiary butyl aminoethoxyethanol, 2-(2-tertiarybutylamino)-propoxyethanol, tertiaryamylaminoethyoxyethanol, (1-methyl-1-ethylpropylamino)ethoxyethanol, 2-2(2-isopropylamino)propoxyethanol and mixtures thereof. A preferred secondary aminoether alcohol is tertiary butylaminoethoxyethanol, hereinafter referred to as EETB, having the formula:

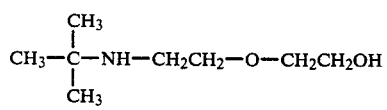

Suitable di-secondary amino ethers include those disclosed in U.S. Pat. No. 4,405,583 having the general formula:

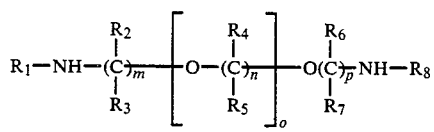

wherein $R_1$ and $R_8$ are each independently selected from the group consisting of alkyl having 1 to 8 carbon atoms and hydroxyalkyl radicals having 2 to 8 carbon atoms, $R_2$, $R_3$, $R_4$, $R_5$, $R_6$ and $R_7$ are each independently selected from the group consisting of hydrogen, $C_1$–$C_4$ alkyl and hydroxyalkyl radicals, with the proviso that $R_2$, $R_3$, $R_6$ and $R_7$ bonded to the carbon atoms directly bonded to the nitrogen atoms are $C_1$–$C_4$ alkyl or hydroxyalkyl radicals when $R_1$ and $R_8$ are primary alkyl or primary hydroxyalkyl radicals and when $R_1$ and $R_8$ are secondary alkyl or secondary hydroxyalkyl radicals, at least one of $R_2$ or $R_3$ and $R_6$ or $R_7$ bonded to the carbon atom directly bonded to the nitrogen atoms are alkyl or hydroxy radicals, and when $R_2$, $R_3$, $R_6$, and $R_7$ are hydrogen $R_1$ and $R_8$ are tertiary alkyl or tertiary hydroxyalkyl radicals having 4 to 8 carbon atoms, m, n and p are positive integers ranging from 2 to 4, and o is either zero or a positive integer ranging from 1 to 10. Preferably, $R_1$ and $R_8$ are selected from the group consisting of tertiary butyl, tertiary amyl, and cycloalkyl radicals, e.g., cyclopentyl and cyclohexyl and isopropyl radicals. Most preferably, $R_1$ and $R_8$ are both tertiary butyl radicals and $R_2$, $R_3$, $R_4$, $R_5$, $R_6$ and $R_7$ are hydrogen. When $R_1$ and $R_8$ are secondary alkyl radicals, e.g., isopropyl, it is preferred that each of $R_2$ and $R_6$ is a methyl radical. The symbols m, n and p are preferably 2, whereas the symbol o is preferably zero or 1 or 2.

Representative di-secondary amino ethers include, for example, bis-(tertiarybutylaminoethyl)ether, 1,2-bis-(tertiarybutylaminoethoxy)ethane, 1,2-bis-(tertiarybutylaminoethoxyethoxy)ethane, bis[2-(isopropylamino)propyl]ether, 1,2-[2-isopropylamino)-propoxy]ethane and the like.

The amine salt suitable for use as component of the absorbent of the present invention is the reaction product of (a) an amine selected from the group consisting of an alkaline severely hindered amino compound having a $-E_s$ value greater than 1.75 such as the compounds described above, a tertiary amino compound selected from the group consisting of tertiary alkanolamines, such as tertiary diethanolamines (e.g., methyldiethanolamine, i.e., MDEA), triethanolamines and mixtures thereof, and (b) a strong acid, or a thermally decomposable salt of a strong acid, i.e., ammonium salt, or a component capable of forming a strong acid, and mixtures thereof. The amine used as reactant with the strong acid can be the same amino compound (component 1) as present in the absorbent composition or a different amino compound. Preferably, the severely hindered amino compound reactant with the acid is the same as the amino compound that is also present "unreacted" or free in the fresh absorbent.

The acid or thermally decomposable salt, such as the ammonium salt, or an acid forming component, used as reactant to form the amine salt (component 2) of the absorbent composition of the present invention is a strong acid having at least one pKa of not more than about 7, preferably a pKa of not more than 6, more preferably a pKa of less than 5. The term "pKa" with reference to the acid is used herein to designate the logarithm of the reciprocal of the ionization constant of the acid measured at 25° C. When the acid is a polybasic acid, and therefore, has several ionization constants, at least one of the pKa must be not more than 7. Ionization constants are given in Lange's *Handbook of Chemistry* published by Handbook Publishers, Sandusky, Ohio, 1952, pages 1229–1235. The component reacted with the alkaline severely hindered amino compound to form the amine salt may be a strong acid, a salt of a strong acid, the cation of which will decompose, such as ammonium salts of strong acids, or a precursor of a strong acid. Suitable strong acids include inorganic acids such as sulfuric acid, sulfurous acid, phosphoric acid, phosphorous acid, pyrophosphoric acid; organic acids, such as acetic acid, formic acid, adipic acid, benzoic acid, etc. Suitable salts of these acids include the ammonium salts, for example, ammonium sulfate, ammonium sulfite, ammonium phosphate and the mixtures thereof. Preferably ammonium sulfate (a salt) or $SO_2$ (a precursor of an acid) is used as reactant. Suitable amine salts are those that are non-volatile at conditions used to regenerate the absorbent composition.

A sufficient amount of amine salt is present in the initial fresh on regenerated absorbent composition to provide at least about a mole ratio of 0.1:1 of amine salt to unreacted severely hindered amino compound, preferably a mole ratio ranging from about 0.1:1 to 4:1, more preferably from about 0.2:1 to 1:1, most preferably from about 0.3:1 to 1:1 of amine salt per mole of unreacted severely hindered amino compound.

The amine salt may be preformed and then added in appropriate ratio to the unreacted (free) severely hindered amino compound or the amine salt may be formed by reacting the strong acid or precursor thereof with the hindered amino compound in such proportions as to maintain the desired ratio of unreacted severely hindered amino compound and in-situ produced amine salt.

The severely hindered amino compound and amine salt, at least prior to use, are dissolved in a liquid medium. Thus, component 1 and component 2, in the required ratio, may be stored and subsequently added to a liquid medium prior to use. Alternatively, the severely hindered amino compound and a strong acid can be mixed with a liquid medium simultaneously or in any order of addition, including adding the preformed amine salt to a liquid medium containing the severely hindered amino compound (component 1). In a preferred embodiment, the strong acid (or ammonium salt or precursor of the strong acid) may be added to a liquid absorbent that is circulating in a gas treating process comprising an absorption zone and a regeneration zone. The point of injection is not critical. The acid or salt of the strong acid may be introduced directly into the absorption zone as a separate stream or added to the severely hindered amino compound-containing liquid being introduced into the absorption zone or into the circulating severely hindered amino compound-containing liquid stream at any point.

In a fresh or regenerated initial absorbent composition comprising water, the unreacted severely hindered amino compound may be present, for example, in an amount ranging from 5 to 70 wt.%, the amine salt may be present in an amount ranging from about 5 to 40 wt.%, calculated as the amine, the balance being water and all said weights being based on the weight of the total liquid absorbent composition.

When the acid or acid forming material is added to a liquid stream comprising the severely hindered amino compound free of amine salt, suitable amount of acid, when the acid is a monobasic acid, to be added to such a liquid stream may range from 9 to 80 mole % acid based on total moles of severely hindered amino compound in said stream. When the acid is a polybasic acid, an amount suited to give an equivalent reaction may be added.

The liquid medium in which components 1 and 2 are contained prior to use may be water, an organic solvent and mixtures thereof. Preferably, the liquid medium comprises water.

Suitable organic solvents include physical absorbents (as opposed to chemical absorbents) such as those described in U.S. Pat. No. 4,112,051, the teachings of which are hereby incorporated by reference and may be, for example, aliphatic acid amides, N-alkylated pyrrolidones, sulfones, sulfoxides, glycols and the mono- and diethers thereof. The preferred physical absorbents are sulfones, preferably sulfolane. If a mixture of solvent and water is used as the liquid medium, a typical amount of solvent may range from 0.1 to 5 moles per liter of total absorbent composition, preferably from about 0.5 to 3 moles per liter, depending upon the particular components used.

The absorbent composition of the present invention may include a wide range of additives typically employed in selective gas removal processes, such as antifoaming agents, antioxidants, corrosion inhibitors and the like in an effective amount. Furthermore, amino compounds other than the severely hindered amino compounds may be added to the absorbent composition in varying amounts.

The Absorption Process

The absorbent composition of the present invention is suitable for use as selective absorbent to remove acidic gases, such as hydrogen sulfide, from a fluid mixture containing hydrogen sulfide.

Feed Fluid

The fluid mixtures suited to be treated with the absorbent composition of the present invention include liquid or gaseous mixtures comprising hydrogen sulfide. The fluid mixture is preferably a normally gaseous mixture (i.e., mixture which is gaseous at standard temperature and pressure conditions). The fluid mixtures may contain from about 0.01 to 25 mole percent hydrogen sulfide based on the total fluid mixture to be treated. Preferably, the fluid mixture comprises hydrogen sulfide and carbon dioxide. The fluid mixture may also comprise other acidic components, such as $CS_2$, COS, and oxygen and sulfur derivatives of C1 to C4 hydrocarbons, such as gaseous mixtures resulting from shale pyrolysis, refinery gas, gas resulting from the gasification of petroleum coke or gasification of coal, natural gas, etc. The process of the present invention is particularly well suited for the selective removal of $H_2S$ from fluid mixtures comprising $H_2S$ and $CO_2$. The feed fluid mixture may have a low hydrogen sulfide partial pressure relative to that of other components, such as carbon dioxide. Example of gases with relatively low partial pressures of hydrogen sulfide include gases derived from the gasification of coal or coke, sulfur plant tail gas, such as Claus plant tail gas and low joule fuel gases resulting from conversion of heavy hydrocarbon oils to lower molecular weight liquid and gaseous products. Hereinafter the fluid will be referred to as a "gas" for simplicity of description.

The hydrogen sulfide containing gaseous mixture is contacted with the liquid absorbent in a contacting zone, that is, an absorption zone at absorption conditions to remove at least a portion of the hydrogen sulfide from the gaseous mixture and produce a gaseous product (absorption zone effluent) having a decreased amount of hydrogen sulfide relative to the hydrogen sulfide present in the initial feed gas. The contacting step may be conducted cocurrently or countercurrently, preferably countercurrently. The contacting zone may be any suitable tower or vessel.

Suitable absorption conditions include an inlet temperature of the absorbent during the absorption step ranging from 10° C. to 100° C., preferably from about 20° C. to about 60° C. Pressures may vary widely. Suitable pressures include from about 5 to about 2000 psia, preferably 10 to 1500 psia, more preferably 10 to 1000 psia in the absorption zone. The contacting takes place under conditions such that hydrogen sulfide is selectively absorbed by the absorbent composition. The process of the invention is suitable to produce an exit gas (absorption zone effluent) containing less than about 10 vppm $H_2S$, preferably less than about 1 vppm $H_2S$, i.e., low $H_2S$ leak, even with low pressure feed gases. The amount of absorbent composition required to be circulated to obtain a given degree of hydrogen sulfide removal will depend in part on the chemical nature and alkalinity of the amino compound and on the partial pressure of hydrogen sulfide in the feed gas.

After contacting the gaseous mixture with the absorbent composition which has become saturated or partially saturated with hydrogen sulfide, the absorbent composition may be at least partially regenerated so that it may be recycled back to the absorption zone. Regeneration or desorption of the acid gases from the absorbent composition may be accomplished by conventional means, such as pressure reduction of the absorbent composition or increase of temperature to a point at which the absorbed $H_2S$ flashes off, or by passing the absorbent composition into a vessel of similar construction to that used in the absorption step, at the upper portion of the vessel, and passing an inert gas such as air or nitrogen or preferably steam upwardly through the vessel. The temperature of the absorbent composition during the regeneration step is suitably in the range from about 50° to about 170° C., preferably from about 80° to about 150° C., and the pressure in the regeneration zone may range from about 0.5 to about 100 psia, preferably from about 1 to about 50 psia. The regenerated absorbent composition, after having been cleansed of at least a portion of the hydrogen sulfide gas, may be recycled back to the absorption zone. Make up absorbent composition may be added as needed.

Suitable ratio of steam to absorbent composition during the regeneration step may range from about 0.4 to about 3.0 pounds of steam per gallon of liquid absorbent circulated to the regeneration zone. Because of the improved performance resulting from the process of the invention, steam ratios resulting in low $H_2S$ leak are typical of the steam ratios of conventional processes which produce high leak, that is, typically 0.5 to 1.5 pound of steam per gallon of liquid absorbent.

DESCRIPTION OF THE PREFERRED EMBODIMENT

Referring to FIG. 1, a normally gaseous mixture comprising $H_2S$ and $CO_2$ to be purified is introduced through line 10 into the lower portion of a gas-liquid countercurrent contacting column 12, said contacting column having a lower section 14 and an upper section 16. The contacting column 12 may contain contacting means such as trays, packed beds, or other such conventional devices. If desired, the upper and lower section may be segregated. An alkaline severely hindered amino compound dissolved in water is introduced into the upper portion of the column through line 18. A salt of a strong acid, for example, ammonium sulfate dissolved in water is introduced into line 18 by line 20. Alternatively, the ammonium sulfate aqueous solution may be introduced directly into the absorption zone or at any other point of the circulating stream, such as lines 24, 34, etc. Furthermore, the preformed amine salt may be introduced. A sufficient amount of the ammonium sulfate is introduced into the circulating stream to obtain the desired mole ratio of amine salt to unreacted amino compound. When the desired ratio has been produced, the addition of ammonium sulfate may be discontinued. The introduction of ammonium sulfate may be resumed to adjust or maintain the desired ratio constant at a predetermined value. The liquid absorbent flowing to the bottom of the column encounters the gas flowing countercurrently and absorbs the hydrogen sulfide preferentially. The gas freed from most of the hydrogen sulfide exits through line 22 for final use. The absorbent containing hydrogen sulfide and some $CO_2$ flows towards the bottom portion of the column from which it is discharged through line 24. The absorbent is then pumped via optional pump 26 through an optional heat exchanger 28 disposed in line 24 which allows the hot liquid from regenerator 30 to exchange heat with the cooler liquid from the absorbent column 12 for energy conservation. The absorbent is sent via line 24 into the upper portion of regenerator 30 which may be equipped with contacting devices such as trays and effects the desorption of hydrogen sulfide and other gases carried along in the absorbent. This acid gas mixture is passed through line 32 into a condenser 34 wherein cooling and condensation of water and liquid absorbent from the gas occurs. The gas then enters into a separator 36 where further condensation is effected. The condensed absorbent is returned through line 38 to the upper portion of the regenerator 30. The gas remaining from the condensation which contains hydrogen sulfide and some $CO_2$ is removed through line 40 for final dispoal, e.g., to an apparatus which converts the hydrogen sulfide to sulfur, such as a Claus kiln or a Stretford conversion unit (not shown). The liquid absorbent is liberated from most of the gas which it contains while flowing downward through the regenerator 30 and exits through line 42 at the bottom of the regenerator for transfer to a reboiler 44. Reboiler 44, equipped with an internal source of heat (e.g., steam injected through line 46 and the condensate exits through a second pipe not shown), vaporizes a portion of this liquid (mainly water) to drive further hydrogen sulfide therefrom. The hydrogen sulfide and steam driven off are returned via line 48 to the lower section of regenerator 30 and removed through line 32 for entry into the condensation stages of gas treatment. The liquid remaining in reboiler 44 is withdrawn through line 50, cooled in heat exchanger 28, and introduced via the action of pump 52 (optional if the pressure is sufficiently high) through line 18 into absorption column 12.

Alternatively other process configurations may be employed to advantage. For example, a two-stage regeneration-absorption configuration may be employed. Such configurations are known to those skilled in the art. In one such configuration, herein designated configuration A, a portion of the solution is withdrawn partially regenerated from a mid-point in the regenerator and introduced, after appropriate heat exchange to cool as required, to a mid-point in the absorber. The rest of the solution is fully regenerated in the regenerator. The fully regenerated solution is sent to the top of the absorber. The partially H₂S and CO₂ laden stream from the top of the absorber is mixed with the partially regenerated solution at a mid-point of the absorber and the combined stream is sent to the bottom of the absorber. In such a two-stage regeneration-absorption configuration, the amine salt, acid, or decomposable salt of the acid may be introduced into any of the liquid absorbent streams as described in the embodiment of FIG. 1.

An alternative other configuration, herein designated configuration B, is a segregated two-stage configuration. As in the above-described two-stage configuration, a partially regenerated stream and a fully regenerated stream are produced in the regenerator but these streams are kept segregated. The fully regenerated solution from the regenerator is sent to the top of the absorber to provide final gas clean up. After passing through the top of the absorber, the solution is withdrawn and sent to the bottom of the regenerator for regeneration. The partially regenerated solution withdrawn from the mid-point of the regenerator is introduced to the mid-point of the absorber for removal of most of the H₂S in the feed gas. The H₂S rich laden stream from the bottom of the absorber is then sent to the top zone of the regenerator for partial desorption of the acid gas. In this configuration, the two streams are kept segregated and one or both may contain the amine salt of the present invention. For example, only the lean solution needs to contains the amine salts since it provides the final H₂S removal and addition of the amine salt to this stream would permit low H₂S leak to be achieved readily. The advantage of such a configuration is that since only a fraction of solution contains the amine salt, less total amine would be required since semi-regenerated solution does not contain the amine salt.

Three characteristics which are of importance in determining the effectiveness of an absorbent are "selectivity", "loading" and "capacity". The term "selectivity" is used herein to define the following mole ratio:

$$\frac{\text{(moles of H}_2\text{S/moles of CO}_2\text{) in liquid phase}}{\text{(moles of H}_2\text{S/moles of CO}_2\text{) in gaseous phase}}$$

The higher the fraction, the greater the selectivity of the liquid absorbent for the hydrogen sulfide in the gas mixture.

By the term "loading" is meant the concentration of hydrogen sulfide or other acid gases physically dissolved and chemically combined in the liquid absorbent as expressed in moles of gas per mole of the alkaline amino compound. The best amino compounds are those which exhibit good selectivity up to a relatively high loading level.

"Capacity" is defined as the moles of hydrogen sulfide loaded in the liquid absorbent at the end of the absorption step minus the moles of hydrogen sulfide loaded in the liquid absorbent at the end of the desorption step. High capacity enables one to reduce the amount of absorbent liquid to be circulated and use less heat or steam during regeneration.

The following examples are presented to illustrate the invention.

EXAMPLE 1

Comparative experiments were made using an absorbent composition, hereinafter referred to as absorbent composition A, which comprised methyl diethanolamine (MDEA) and sulfuric acid and which was not a composition of the present invention with absorbent composition B comprising tertiary butylaminoethoxyethanol (EETB) and sulfuric acid, which was a composition in accordance with the present invention, to show the effect of sulfuric acid addition to H₂S selectivity.

The gas mixture used in these experiments is is shown in Table I.

TABLE I

| Component | Mole % (dry basis) |
|---|---|
| H₂S | 1 |
| CO₂ | 10 |
| N₂ | 89 |

In these experiments, the concentration of free MDEA for H₂S removal was kept at 2M whereas the amount of sulfuric acid and the total amount of MDEA varied to give the 3 values of protonated amine concentration relative to total amine concentration of 0 mole %, 11 mole % and 33 mole %. In the experiment using EETB, the concentration of free EETB was kept at 1.5M and the amount of sulfuric acid and total amount of EETB varied to give 0 mole %, 11 mole % and 33 mole % of protonated amine. For these experiments, the percent protonation for each amine was calculated as follows: 100 times the moles of amine salt divided by the moles of amine salt plus the moles of unreacted (free) amine.

Figure 2:
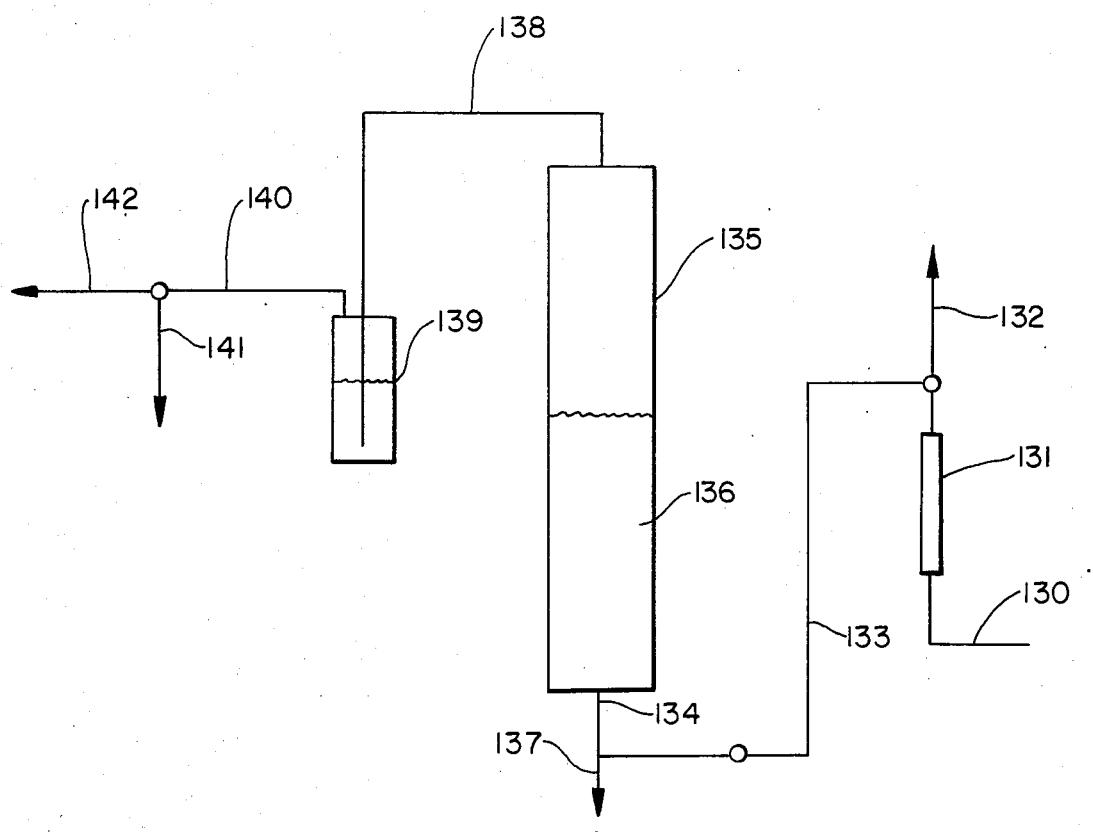
FIG. 2 is a schematic flow plan illustrating an absorption unit for use in rapid determination of the selective removal of $H_2S$ from gaseous streams.

FIG. 2 illustrates the sparged absorber unit operated on a semi-batch mode, used to evaluate the selectivity of hydrogen sulfide removal with the absorbent composition. Sulfuric acid was added to an aqueous solution containing MDEA and to an aqueous solution containing EETB.

The experiments were conducted as follows: the gas mixture described in Table I was passed from a gas cylinder (not shown) through line 130 to a meter 131 measuring the rate at which the gas is fed to the absorber. For this example, this rate was 3.6 liters per minute. The gas was then passed through line 132 to a gas chromatography column (not shown) continuously monitoring the composition of the inlet gas and through lines 133 and 134 to a sparged absorber unit 135, which is a cylindrical glass tube 45 cm high and 3.1 cm in diameter charged with 100 ml of the absorbent liquid 136. The gas was passed through the liquid absorbent at a temperature of liquid absorbent of 40° C. and 10 ml samples of the liquid absorbent were periodically removed from the bottom of the absorber unit through lines 134 and 137 to be analyzed for H₂S and CO₂ content. The H₂S content in the liquid sample was determined by titration with silver nitrate. The CO₂ content of the liquid sample was then analyzed by acidifying the sample with an aqueous solution of 10% HCl and measuring the evolved CO₂ by weight gain on NAOH-coated asbestos.

While the liquid was being periodically withdrawn from the bottom of the absorber unit, the gas mixture was removed from the top thereof to a trap 139 which served to scrub out any H₂S in the outlet gas. The resulting gas could optionally then be passed via lines 140 and 141 for final disposal or via line 142 to a gas chromatography column (not shown) for periodic evaluation of the composition of the outlet gas. For purposes of this example, the hydrogen sulfide and carbon dioxide contents of the inlet gas phase were measured and the hydrogen sulfide and carbon dioxide contents of the liquid phase were determined as described above. These data were used to calculate selectivity values of the absorbent as defined above, which were plotted as a function of the loading of the absorbent with $H_2S$ and $CO_2$, in units of moles acid gas per mole alkaline absorbent.

Figure 3:
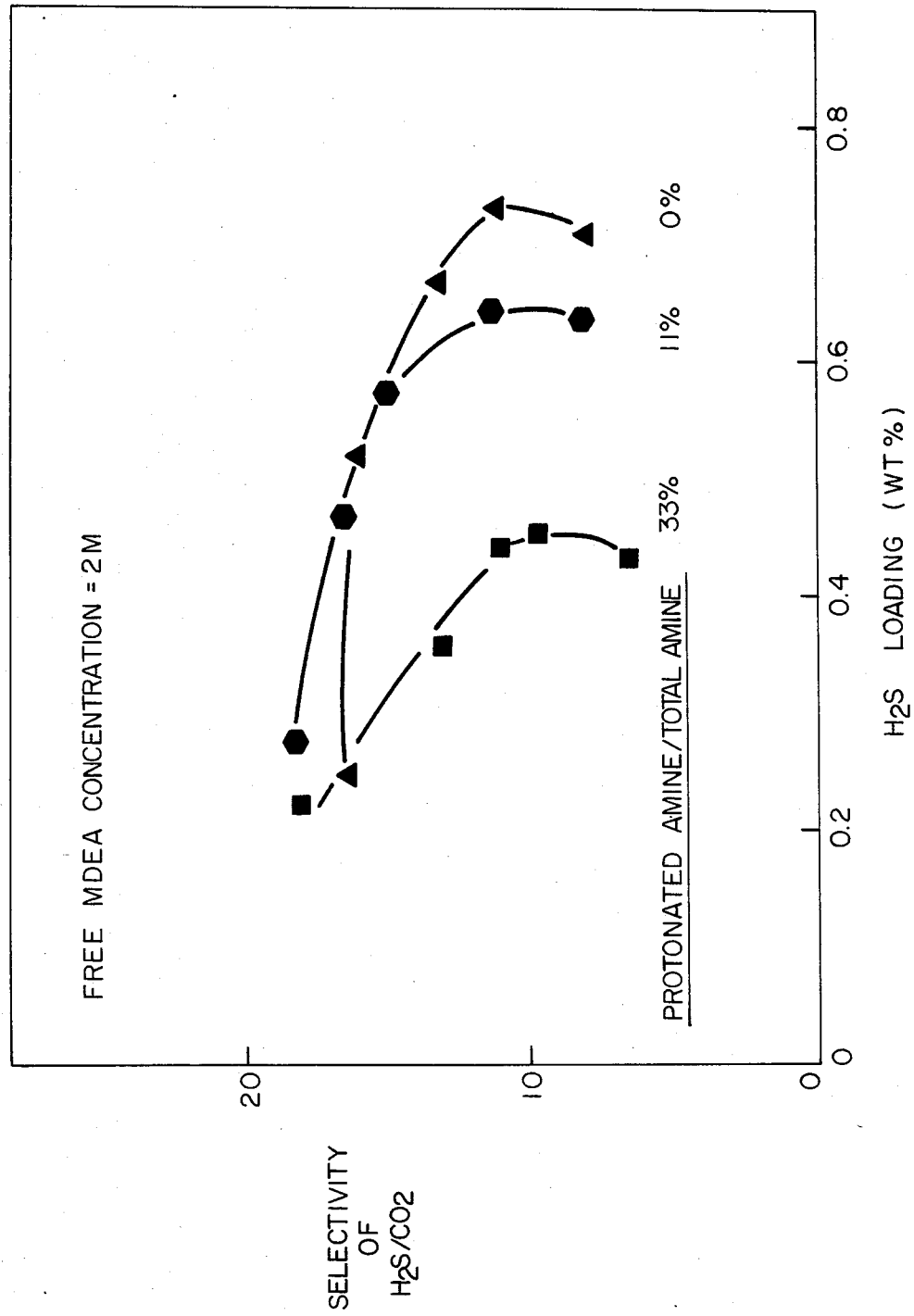
FIG. 3 is a graph showing the effect of $H_2SO_4$ addition to methyldiethanolamine on $H_2S$ selectivity.

The results of these experiments are summarized in FIGS. 3 and 4. FIG. 3 shows the $H_2S$ selectivity of MDEA+$H_2SO_4$ absorbent composition. FIG. 4 shows the $H_2S$ selectivity of EETB+$H_2SO_4$ absorbent composition. As can be seen from these figures, the absorbent composition B of the present invention had increased $H_2S$ selectivity with the increased addition of $H_2SO_4$.

EXAMPLE 2

Experiments were conducted in a continuous absorption-regeneration unit such as the unit described in FIG. 1. The absorber and regenerator were packed with pall rings.

A gaseous mixture having the composition shown in Table II was contacted with an absorbent composition in an absorption zone at a temperature of about 100° F., and a pressure of about 17 psia. A constant absorbent circulation rate was used for all the runs.

TABLE II

| Constituent | Mole % (dry basis) |
| --- | --- |
| $H_2S$ | 1.7 |
| $CO_2$ | 10.0 |
| $N_2$ | 83.3 |

The absorbent composition used was varied as shown in Table III.

TABLE III

| Run | Mole Ratio Amine Salt to Unreacted Amine | Wt. %[2] Amine Salt | Wt. %[1] Unreacted Amine | vppm $H_2S$ in Absorption Zone Effluent | Steam, lb/gallon |
| --- | --- | --- | --- | --- | --- |
| 1 | 0 | 0 | 24 | 100 | 1.15 |
| 2 | 0.22 | 5 | 23 | 50 | 0.9 |
| 3 | 0.44 | 10.5 | 24 | 1 | 0.8 |
| 4 | 0.50 | 12 | 24 | less than 1 | 0.6 |

[1]Based on total weight of absorbent composition.
[2]Based on total weight of absorbent composition and calculated as amine.

Runs 2, 3 and 4 are runs in accordance with the present invention. Runs 3 and 4 are runs within the most preferred mole ratio of amine salt to unreacted amine.

The alkaline severely hindered amino compound present in the absorbent was tertiary butyl aminoethoxy ethanol (EETB). The amine salt was the reaction product of EETB and $(NH_4)_2SO_4$.

What is claimed is:

1. An absorbent composition comprising: (1) at least one severely hindered amino compound having a cumulative $-E_s$ value (Taft's steric hindrance constant) greater than 1.75, and (2) an amine salt, said amine salt being the reaction product of an amine selected from the group consisting of a severely hindered amino compound having a cumulative $-E_s$ value greater than 1.75, a tertiary amine and mixtures thereof and a component selected from the group consisting of an acid having at least one pKa of not more than about 7, a decomposable salt of an acid having at least one pKa of not more than about 7, a compound capable of forming an acid having a pKa of not more than about 7 and mixtures thereof, said amine salt and said severely hindered amino compound being present in said absorbent composition in a mole ratio of said amine salt to said severely hindered amino compound ranging from about 0.2:1 to 4:1.

2. The absorbent composition of claim 1 wherein said absorbent composition additionally comprises a liquid selected from the group consisting of water, an organic solvent and mixtures thereof.

3. The absorbent composition of claim 1 wherein said severely hindered amino compound is selected from the group consisting of a secondary amino ether alcohol, a di-secondary amino ether, and mixtures thereof.

4. The absorbent composition of claim 1 wherein said component reacted with said amine is selected from the group consisting of sulfuric acid, phosphoric acid, phosphorous acid, pyrophosphoric acid, sulfurous acid, and mixtures thereof.

5. The absorbent composition of claim 1 wherein said component reacted with said amine is selected from the group consisting of ammonium sulfate, ammonium sulfite, sulfur dioxide, ammonium phosphate and mixtures thereof.

6. The absorbent composition of claim 1 wherein said mole ratio of said amine salt to said severely hindered amino compound ranges from about 0.2:1 to 1:1.

7. The absorbent composition of claim 1 wherein said mole ratio of said amine salt to said severely hindered amino compound ranges from about 0.3:1 to 1:1.

8. The absorbent composition of claim 1 wherein said absorbent composition comprises water and wherein said amine salt is a non-volatile water soluble amine salt.

9. The absorbent composition of claim 1 wherein said severely hindered amino compound (1) is tertiary butyl aminoethoxyethanol and said amine salt is the reaction product of said tertiary butyl aminoethoxyethanol and sulfuric acid or a compound capable of forming sulfuric acid.

10. The absorbent composition of claim 1 wherein said absorbent composition comprises from about 5 to 70 wt.% of said severely hindered amino compound, from about 5 to 40 weight percent of said amine salt calculated as amine, and the balance being water.

11. The absorbent composition of claim 1 wherein said amine salt is the reaction product of tertiary butyl aminoethoxyethanol and ammonium sulfate or sulfur dioxide.

12. A process for the selective absorption of $H_2S$ from a fluid mixture comprising $H_2S$ and $CO_2$, which comprises the steps of contacting, in a contacting zone, at absorption conditions, said fluid mixture with an absorbent composition comprising: (1) at least one severely hindered amino compound having a cumulative $-E_s$ value (Taft's steric hindrance constant) greater than 1.75, and (2) an amine salt, said amine salt being the reaction product of an amine selected from the group consisting of a severely hindered amino compound haing a cumulative $-E_s$ value greater than 1.75, a tertiary amine and mixtures thereof and a component selected from the group consisting of an acid having at least one pKa of not more than about 7, a decomposable salt of an acid having at least one pKa of not more than about 7, a compound capable of forming an acid having a pKa of not more than about 7 and mixtures thereof, said amine salt and said severely hindered amino compound being present in said absorbent composition in a mole ratio of said amine salt to said severely hindered amino compound of ranging from about 0.2:1 to about 4:1.

13. The process of claim 12 wherein said absorbent composition additionally comprises a liquid selected from the group consisting of water, an organic solvent and mixtures thereof.

14. The process of claim 12 wherein said severely hindered amino compound is selected from the group consisting of a secondary aminoether alcohol, a di-secondary amino ether, and mixtures thereof.

15. The process of claim 12 wherein said component reacted with said amine is selected from the group consisting of sulfuric acid, sulfurous acid, phosphoric acid, phosphorous acid, pyrophosphoric acid and mixtures thereof.

16. The process of claim 12 wherein said component reacted with said amine is selected from the group consisting of ammonium sulfate, ammonium sulfite, sulfur dioxide, ammonium phosphate and mixtures thereof.

17. The process of claim 12 wherein said amine salt is a reaction product of the same severely hindered amino compound as component (1).

18. The process of claim 12 wherein after said contacting step at absorption conditions, the resulting partially deactivated absorbent composition is subjected to regeneration in a regeneration zone.

19. The process of claim 18 wherein said amine salt is formed in situ in said process.

20. The process of claim 18 wherein said amine salt is first formed and subsequently added to said process.

21. The process of claim 20 wherein said preformed amine salt is added to said process in an amount sufficient to provide said mole ratio of said amine salt (2) to said severely hindered amino compound (1).

22. The process of claim 18 wherein said partially deactivated absorbent composition is contacted with steam in a regeneration zone at a steam to absorbent composition ratio ranging from 0.4 to 3.0 pounds of steam per gallon of said absorbent composition.

23. The process of claim 12 wherein said severely hindered amino compound is tertiary butyl aminoethoxyethanol and said amine salt is the reaction product of said tertiary butyl aminoethoxyethanol and sulfuric acid or a compound capable of forming sulfuric acid.

24. The process of claim 12 wherein said amine salt is the reaction product of tertiary butyl aminoethoxyethanol and ammonium sulfate or sulfur dioxide.

25. The process of claim 12 wherein said mole ratio of said amine salt to said severely hindered amino compound ranges from about 0.3:1 to 1:1.

26. The process of claim 12 wherein said absorption conditions include a temperature ranging from about 10° to 100° C. and a pressure ranging from 5 to 2000 psia.

27. The process of claim 12 wherein said fluid mixture is a normally gaseous mixture.

28. The process of claim 12 wherein said mole ratio of said amine salt to said severely hindered amino compound ranges from about 0.2:1 to 1:1.

* * * * *